(12) United States Patent
Chan

(10) Patent No.: US 7,864,689 B2
(45) Date of Patent: *Jan. 4, 2011

(54) METHOD AND SYSTEM FOR AUTOMATIC MEDIA DEPENDENT INTERFACE RECONFIGURATION AND REPAIR

(75) Inventor: Kevin T. Chan, Pasadena, CA (US)

(73) Assignee: Broadcom Corp.

( * ) Notice: Subject to any disclaimer, the term of this patent is extended or adjusted under 35 U.S.C. 154(b) by 1694 days.

This patent is subject to a terminal disclaimer.

(21) Appl. No.: 10/612,729

(22) Filed: Jul. 2, 2003

(65) Prior Publication Data

US 2005/0021734 A1 Jan. 27, 2005

(51) Int. Cl.
*H04L 12/28* (2006.01)

(52) U.S. Cl. .................... 370/248; 370/254; 370/431

(58) Field of Classification Search ............ 370/242, 370/445, 450, 217, 228, 254, 230, 248, 252, 370/253, 431, 433, 437, 463
See application file for complete search history.

(56) References Cited

U.S. PATENT DOCUMENTS

| | | | | |
|---|---|---|---|---|
| 5,923,663 | A * | 7/1999 | Bontemps et al. | 370/445 |
| 6,108,713 | A * | 8/2000 | Sambamurthy et al. | 709/250 |
| 6,175,865 | B1 * | 1/2001 | Dove et al. | 709/220 |
| 6,661,805 | B1 * | 12/2003 | Romano et al. | 370/450 |
| 6,684,347 | B1 * | 1/2004 | Coffey | 714/43 |
| 7,127,624 | B2 * | 10/2006 | Berman et al. | 713/320 |
| 7,271,641 | B1 * | 9/2007 | Roo | 327/404 |
| 7,292,596 | B1 * | 11/2007 | Campana et al. | 370/419 |
| 2002/0023234 | A1 | 2/2002 | Berman et al. | |
| 2004/0223462 | A1 * | 11/2004 | Cromer et al. | 370/252 |

FOREIGN PATENT DOCUMENTS

EP 0863640 A 9/1998

OTHER PUBLICATIONS

Huang et al. "Simulated Performance of 1000BASE-T Receiver with Different Analog Front End Designs", Solid-State Circuits Research laboratory Department of Electrical and Computer Engineering University of California, Davis, Davis, CA 95616 (4 pages).

* cited by examiner

*Primary Examiner*—Seema S Rao
*Assistant Examiner*—Mon Cheri S Davenport
(74) *Attorney, Agent, or Firm*—McAndrews, Held & Malloy, Ltd.

(57) ABSTRACT

Providing and configuring communication links may include determining a usable media pair from all existing media pairs and selecting any one channel from all existing channels. The selected channel may be assigned to any one of the media pairs. Any one or any combination of media pairs may be monitored in order to detect the existence of a communication signal on any of the media pairs. Some or all of the existing media pairs may be monitored to determine which of the media pair may be capable of facilitating communication at a maximum communication speed and if not, at a reduced speed. Any selected channel may be cross-connected to any one of the existing media pairs, which may be capable of facilitating communication at the maximum or reduced communication speed.

30 Claims, 8 Drawing Sheets

METHOD AND SYSTEM FOR AUTOMATIC MEDIA DEPENDENT INTERFACE RECONFIGURATION AND REPAIR

CROSS-REFERENCE TO RELATED APPLICATIONS/INCORPORATION BY REFERENCE

This application makes reference to U.S. patent application Ser. No. 10/612,025, Publication No. 2005/0002328, entitled "Method and System for Secure Automatic Media Dependent Interface Reconfiguration and Repair," which was filed concurrently herewith on Jul. 2, 2003 and incorporated by reference in its entirety.

FIELD OF THE INVENTION

Certain embodiments of the invention relate to communications media configuration. More specifically, certain embodiments of the invention relate to a method and system for automatic media dependent interface (MDI) reconfiguration and repair.

BACKGROUND OF THE INVENTION

The coupling and configuration of two interfaces in a communication system is generally critical to the operation of devices whose interfaces are being coupled. In some instances, improper coupling or configuration may result in one or more of damaged equipment, malfunctioning equipment and system failure. Particularly in systems which lack redundancy, improper coupling or configuration may, in certain instances, render a system or specific sub-system inoperable. In order to mitigate the effects of improper coupling and configuration, various techniques and methodologies have been implemented. Automatic media dependent interface (MDI) crossover (Auto-MDIX), Ethernet@wirespeed and cable diagnostics, for example, provide ways for eliminating or otherwise mitigating certain effects that result from improper coupling or configuration.

In a typical 4-pair conductor or wire system, auto-MDIX may be adapted to automatically detect the order of media pairs 1 and 2 and in certain instances, auto-MDIX may reconfigure only certain channels so as to properly re-assign the transmit/receive media pairs to these channels. Auto-MDIX may also be adapted to reconfigure channel ordering for certain channels in order to mitigate the effects of improper interfacing and/or configuration. In 1000 Base-T mode for example, auto-MDIX may reconfigure the operational mode of media pairs 3 and 4 in accordance with or dependent on the order of media pairs 1 & 2. Auto-MDIX may eliminate a need for crossover cables which may be utilized between hubs and routers, for example. Finally, auto-MDIX may simplify installation in certain applications since the wiring order of a cable plant does not have be known.

Notwithstanding, Auto-MDIX is limited to reconfiguring only media pairs 1 and 2 and media pairs 3 and 4. In particular, auto-MDIX relies on a basic assumption that media pairs 1 & 2 are wired respectively and media pairs 3 & 4 are wired respectively. Accordingly, a major drawback with auto-MDIX is that auto-MDIX does not operate on other combinations of wiring configurations. For example, auto-MDIX does not operate on media pairs 1 and 3 or media pairs 2 and 4 and as a result, may be able to reconfigure and/or correct an improper installation involving media pairs 1 and 3 and media pairs 2 and 4. Another disadvantage of auto-MDIX is that it operated on a basic assumption that media pairs 1 and 2 are wired respectively and media pairs 3 & 4 are wired respectively.

On the contrary, Ethernet@wirespeed provides an algorithm that is adapted to detect the conditions on the media and/or the coupling interface and to select and implement an appropriate methodology for mitigating the effects of improper cabling or interfacing. In this regard, Ethernet@wirespeed may be adapted to automatically down shift or reduce transmission speed whenever optimal transmission cannot be maintained or supported due to impairments in the channel characteristics, which may be caused by improper cabling or interfacing. Ethernet@wirespeed may be particularly useful in cases where channel or media characteristics have degraded but the channel or media is still required for providing communication. For example, in 1000 Base-T applications, the conditions on the media may deteriorate to a point where 1000 Base-T operational speeds cannot be sustained, but the channel cannot be taken out of service because it is needed for providing data communication. As a result, 10/100 Base-T service may be provided. One drawback with Ethernet@wirespeed is that it does not operate on a broken or damaged media pair 1 or media pair 2 in a cable plant. Moreover, Ethernet@wirespeed does not have the capability to reconfigure wire pairs in order to utilize other good pairs in the cable plant. For example, in a case where media pair 3 or pair 4 may be unused, Ethernet@wirespeed does not have the capability to reconfigure media pair 3 or media pair 4 for communication.

In contrast, cable diagnostics may be adapted to provide information pertaining to the quality of a cable plant. In this regard, cable diagnostics may detect whether there is, for example, an open, short or proper termination on the cable or media. Cable diagnostics may be adapted to determine, for example, the length of the cable plant or media, and provide information regarding a location of an impedance mismatch in the cable plant. Notwithstanding, cable diagnostics does not have the capability to determine whether the cable plant has been incorrectly installed. For example, in a case where media pair 1 and media pair 3 are swapped but all the termination points are correct, cable diagnostics does not have the capability to detect and report the swapped cable condition. In this case, cable diagnostics will report that all is copasetic, even though media pair 1 has been swapped with media pair 3.

Various standards such as 10 Base-T, 100 Base-T and 1000 Base-T have been developed to provide communications over unshielded twisted pair. For example, 1000 Base-T was developed to provide data communication at speeds of the order of 1 Gigabits per second (Gbps) over category-5 (CAT-5) unshielded twisted pair (UTP) wire or cable. The 1000 Base-T standard defines a five (5) level pulse amplitude modulated signal that may be transmitted over the CAT-5 wiring.

In this regard, a 1000 Base-T transceiver may be adapted to transmit data at a rate of 125 megasymbols over each pairs in a 4 media pair in a CAT-5 wire or cable. Since each 125 megasymbol carries 250 megabits per second, the effective rate over four (4) media pairs is one gigabit per second.

To mitigate the effects of interference such as near-end crosstalk, far-end crosstalk, echo and attenuation resulting from use of the unshielded twisted pair, a 1000 Base-T transceiver may include an analog front end (AFE). The analog front end may include, but is not limited to, analog-to-digital converters (ADCs), digital-to-analog converters (DACs) and amplifiers. These devices that may be required to implement the analog front end may require additional chip area, which increases the size of the transceiver chip.

FIG. 1 is a block diagram of a conventional auto-MDIX system, which utilizes four (4) media pairs. Referring to FIG. 1, there is shown a first AFE 102 which is a 10/100/1000 Base-T AFE, a second AFE 104 which is a 10/100/1000 Base-T AFE, a third AFE 106 which is a 1000 Base-T AFE, a fourth AFE 108 which is a 1000 Base-T AFE, a first auto-MDIX controller 110 and a second auto-MDIX controller 112. The first AFE 102 may be coupled to a first media pair and the second AFE 104 may be coupled to a second media pair. The third AFE 106 may be coupled to a third media pair and the fourth AFE 108 may be coupled to a fourth media pair. The first auto-MDIX controller 110 is coupled to a channel A transmit/receive data signal and a channel B transmit/receive data signal. The second auto-MDIX controller 112 is coupled to a channel C transmit/receive data signal and a channel D transmit/receive data signal. Although AFEs 106, 108 are represented as 1000 Base-T AFEs, they may be configured to provide additional 10/100 Base-T functionality.

Notwithstanding, in the auto-MDIX configuration of FIG. 1, the first controller 110 operates independent of the second controller 112. The first controller 110 may only control the coupling or cross-connect of channel A or channel B to any of only the first media pair or the second media pair. Similarly, the second controller may only control the coupling or cross-connect of channel C or channel D to any of only the first media pair or the second media pair. Accordingly, the first controller 110 cannot cross-connect channel A or channel B to any of the third media pair or the fourth media pair and the second controller 112 cannot cross connect channel C or channel D to any of the first media pair or the second media pair.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention include a method and system for providing and configuring communication links. The method for providing and configuring communication links may include determining a usable media pair from all existing media pairs and selecting any one channel from all existing channels. The selected channel may be assigned to any one of the media pairs. Any one or any combination of media pairs may be monitored in order to detect the existence of a communication signal on any of the media pairs.

Some or all of the existing media pairs may be monitored to determine which of the media pairs may be capable of facilitating communication at a maximum communication speed. Any selected channel may be cross-connected to any one of the existing media pairs, which may be capable of facilitating communication at a maximum communication speed. Alternatively, some or all of the existing media pairs may be monitored to determine which one of the media pairs may be capable of operating at a reduced communication speed. Any selected channel may be cross-connected to any one of the existing media pairs which may be capable of facilitating communication at a maximum communication speed operating at a reduced communication speed.

In another embodiment of the invention any channel/media pair assignment of a previously defined general channel/media pair configuration, which defines channel/media pair assignments for at least a portion of all the existing media pairs, may be flipped or otherwise rearranged or re-assigned. Subsequent to flipping, the flipped channel/media pair assignment may be defined as a default channel/media pair configuration. In another aspect of the invention, a status of at least one of the existing media pairs and/or one of the existing channels may be defined. The status of the existing media pairs and/or the existing channels may be stored in one or more registers.

Another embodiment of the invention provides, a machine-readable storage, having stored thereon a computer program having at least one code section for providing and configuring communication links. The at least one code section may be executable by a machine, thereby causing the machine to perform the steps for providing and configuring communication links.

The invention also provides a system for configuring communication links. The system may include at least one controller which may be adapted to determine a usable media pair from all existing media pairs. At least one selector may be adapted to select any one channel from all existing channels and the controller may assign the selected channel to any one of the selected media pairs. The controller may be configured to determine at least one usable media pair from all of the existing user pairs. A detector may be configured to detect whether a communication signal is on any one of the usable media pairs.

In another aspect of the invention, the controller may determine which one of the existing media pairs may be capable of facilitating communication at a maximum communication speed. The selector may subsequently cross-connect the selected channel to the existing media pair which is capable of facilitating communication at the maximum communication speed. Similarly, the controller may also determine which one of the existing media pairs may be capable of operating at a reduced communication speed. The selector may subsequently cross-connect the selected channel to the existing media pair which is capable of operating at the reduced communication speed. The selector may be configured to flip any channel/media pair assignment of a previously defined general channel/media pair configuration, which defines channel/media pair assignments for at least a portion of the existing media pairs. The controller may then define the flipped channel/media pair assignment as a default channel/media pair configuration.

The controller may be adapted to identify a status of at least one of the existing media pairs, at least one of the existing channels and at least one channel/media pair cross-connection. One or more registers may store the identified status in one or more bit locations. Appropriate bit locations in at least one register may be written to reflect changes to a media pair, a channel and/or a cross-connection. Similarly, appropriate bit locations in a register may be read to determine the status of a media pair, a channel and/or a cross-connection.

These and other advantages, aspects and novel features of the present invention, as well as details of an illustrated embodiment thereof, will be more fully understood from the following description and drawings.

DETAILED DESCRIPTION OF THE INVENTION

Aspects of the invention provides a method and system for automatic media dependent interface (MDI) reconfiguration and repair (AMRR) which may be used to provide and configure communication links. A method for providing and configuring communication links may include determining a usable media pair from all existing media pairs and selecting any one channel from all existing channels. The selected channel may be assigned to any one of the media pairs. Any one or any combination of media pairs may be monitored in order to detect the existence of a communication signal on any of the media pairs. Some or all of the existing media pairs may be monitored to determine which of the media pairs may be capable of facilitating communication at a maximum communication speed and if not, at a reduced speed. Any selected channel may be cross-connected to any one of the existing media pairs, which may be capable of facilitating communication at the maximum or reduced communication speed In another embodiment of the invention any channel/media pair assignment of a previously defined general channel/media pair configuration, which defines channel/media pair assignments for at least a portion of all the existing media pairs, may be flipped or otherwise rearranged or re-assigned. Subsequent to flipping, the flipped channel/media pair assignment may be defined as a default channel/media pair configuration. In another aspect of the invention, a status of at least one of the existing media pairs and/or one of the existing channels may be defined. The status of the existing media pairs and/or the existing channels may be stored in one or more registers.

In one embodiment of the invention, automatic MDI reconfigure and repair may be adapted to detect at least one available and/or usable media pair, determine proper channel assignments for each of a plurality media pairs and automatically assign any of a plurality of channels to the available or usable media pair. In assigning the channel to the media pairs, automatic MDI reconfigure and repair may be adapted to assign any channel to any available or usable media pairs. Automatic MDI reconfigure and repair may be adapted to monitor, detect and automatically reconfigure available or usable media pairs to provide optimal communication. In this regard, automatic media dependent interface reconfigure and repair may be adapted to select available or usable media pairs so that a maximum throughput or communication speed may be attained.

Figure 2:
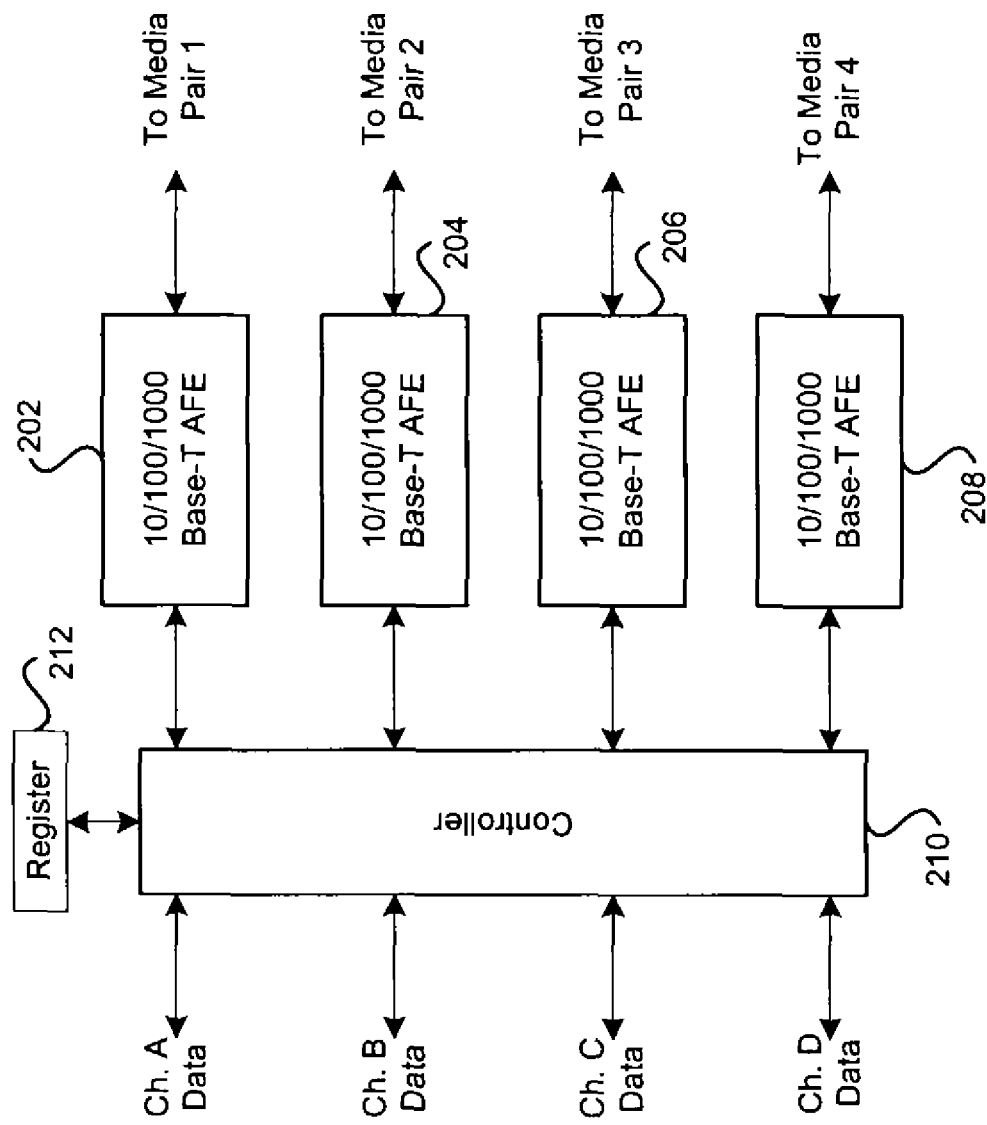
FIG. 2 is a block diagram of an automatic media dependent interface reconfigure and repair system, which utilizes four (4) media pairs in accordance with an embodiment of the invention.

FIG. 2 is a block diagram of an automatic MDI reconfigure and repair system, which utilizes four (4) media pairs in accordance with an embodiment of the invention. Referring to FIG. 2, there is shown a first 10/100/1000 Base-T AFE 202, a second 10/100/1000 Base-T AFE 204, a third 10/100/1000 Base-T AFE 206, a fourth 10/100/1000 Base-T AFE 208, a single controller 210 and a register 212. The first AFE 202 may be coupled to a first media pair and the second AFE 204 may be coupled to a second media pair. Similarly, the third AFE 206 may be coupled to a third media pair and the fourth AFE 208 may be coupled to a fourth media pair. The single controller 210 may be coupled to channel A's transmit/receive data signal, channel B's transmit/receive data signals, channel C's transmit/receive data signals and channel D's transmit/receive data signals.

In accordance with an embodiment of the invention, the single controller 210 may be adapted to cross connect or couple channels A, B, C or D to any of the media pairs 1, 2, 3 or 4. In this regard, channel A data signals may be coupled to any of media pairs 1, 2, 3 or 4 and channel B data signals may be coupled to any of media pairs 1, 2, 3 or 4. Similarly, channel C data signals may be coupled to any of media pairs 1, 2, 3 or 4 and channel D data signals may be coupled to any of media pairs 1, 2, 3 or 4. The controller arrangement of FIG. 2 therefore provides independent channel to media pair cross connect for all of the channels and all of the media pairs.

In another embodiment of the invention, controller 210 may be configured to set or clear one or more bits in register 212. The bits in the register 212 may be utilized to indicate a current cross connect status of the automatic MDI reconfigure and repair system. In this regard a host processor or controller 210, for example, may be adapted to read appropriate portions of register 212 in order to determine an automatic media dependent interface reconfigure and repair connection status. Additionally, one or more bits in the control register may be used to specify or establish a particular cross connect configuration. Accordingly, an external processor may be adapted to set or clear certain bits in the register 212 to indicate a desired cross-connection for a particular channel and media pair. The controller 212 may subsequently read the register 212 and configure the desired cross-connect arrangement. In another aspect of the invention, the automatic MDI reconfigure and repair system may indicate which of the media pairs are available and currently active or in use. The automatic MDI reconfigure and repair status may also provide an indication of which channels may be cross-connected or coupled to which of the media pairs and/or which media pairs are available or unavailable. The status of each channel, media pair and/or cross-connection may be written to the register 212 by controller 210.

Figure 1:
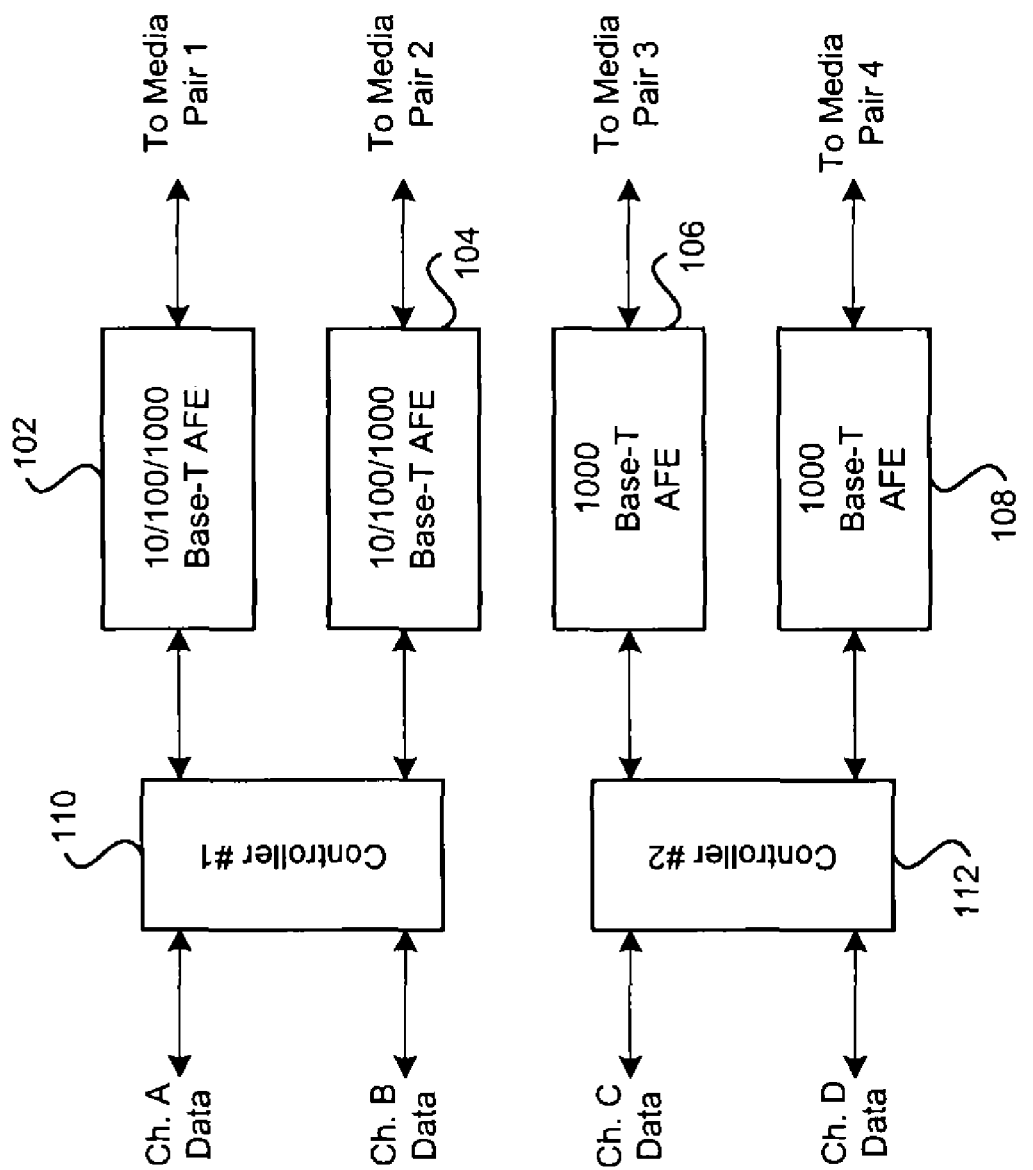
FIG. 1 is a block diagram of a conventional auto-MDIX system, which utilizes four (4) media pairs.
Figure 3:
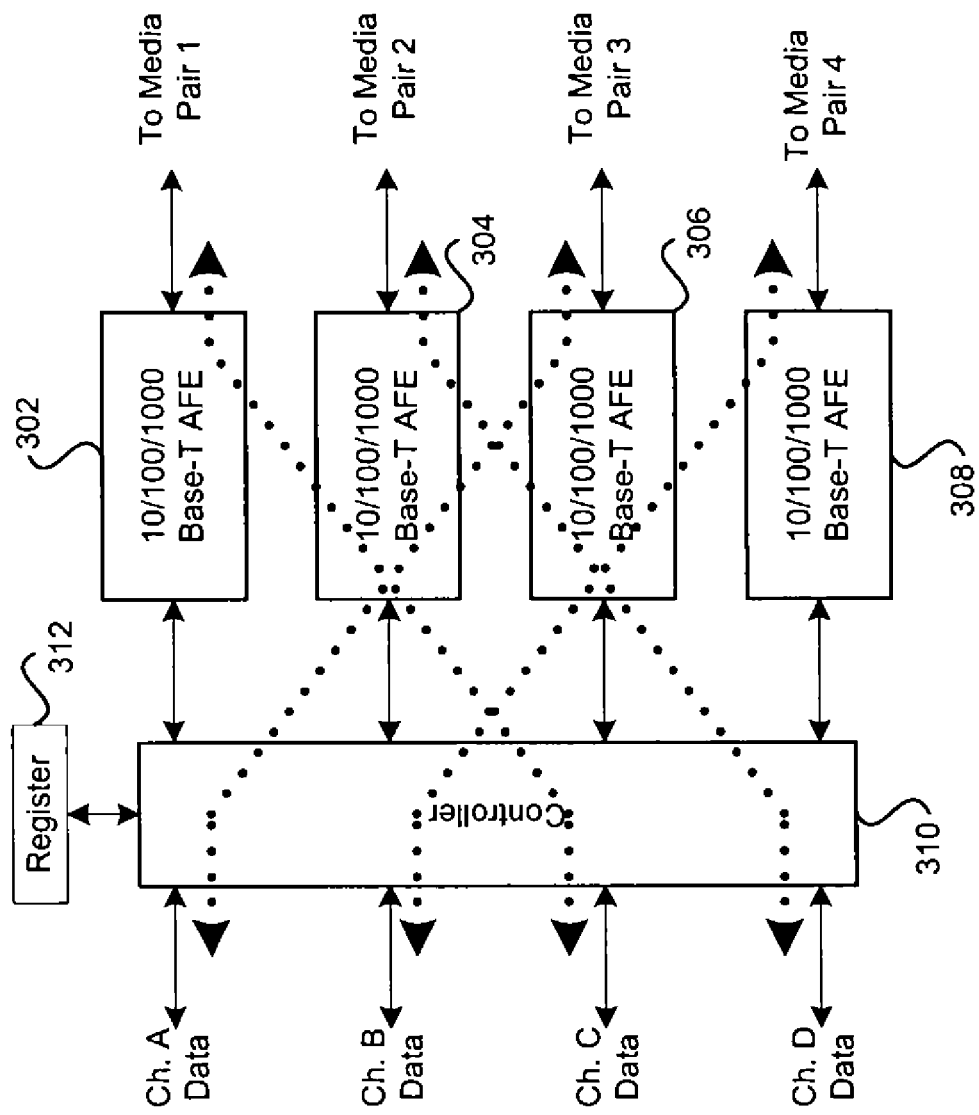
FIG. 3 is a block diagram of an automatic media dependent interface reconfigure and repair system, which may provide full Gigabit four (4) media pairs auto-MDIX in accordance with an embodiment of the invention.

FIG. 3 is a block diagram of an automatic media dependent interface reconfigure and repair system, which may provide full Gigabit four (4) media pairs auto-MDIX in accordance with an embodiment of the invention. Referring to FIG. 3, there is shown a first 10/100/1000 Base-T AFE 302, a second 10/100/1000 Base-T AFE 304, a third 10/100/1000 Base-T AFE 306, a fourth 10/100/1000 Base-T AFE 308, a single controller 310 and a register 312. The configuration of FIG. 3 may be used to enhance the auto-MDIX configuration of FIG. 1 by providing connectivity between channel A data signals and media pair 3 and channel B data signals and media pair 4. This may overcome a major drawback of the auto-MDIX configuration of FIG. 1 where neither channel A nor B may be cross-connected or coupled to media pair 3 or media pair 4.

In accordance with another embodiment of the invention, the controller 310 may be adapted to automatically determine the assignment of gigabit channels to media pairs, for example, when a cabling plant may be incorrectly installed. This may occur with greater frequency than in a two (2) media pair scenario since the greater number of conductors in the four (4) media pair case increases the likelihood of incorrect wiring. The automatic MID reconfigure and repair system configuration of FIG. 3 may provide arbitrary assignment of channel data to any media pair.

In operation, the automatic MDI reconfigure and repair system may be adapted to monitor link pulses from the auto-MDIX pair and determine any existing channel A and channel B assignments. The automatic MDI reconfigure and repair system may be adapted to auto-negotiate and determine the appropriate channel C and channel D assignments. In one aspect of the invention, the automatic MDI reconfigure and repair system may be adapted to utilize a trial-error method to determine the appropriate channel assignments. Notwithstanding, a status of the channel assignments for channels A, B, C and D may be denoted in register 312. Accordingly, a processor such as a host processor and/or controller 312 may be adapted to read the register 312 to determine the status of the channel assignments.

In another aspect of the invention, a channel assignment/wiring order diagnostics may be provided. The channel assignment/wiring order diagnostics may be adapted to determine a status of each of the channels A, B, C, and D and a status of the media pairs 1, 2, 3 and 4. In this regard, controller 310 may determine the status of the channels and/or the media pairs and correspondingly update register 312 by setting and/or clearing corresponding bits in the status register. The register 310 may subsequently be read to determine the status of the channels and/or the media pairs. The channel assignment/wiring order diagnostics may be executed on a continuous basis or it may be executed at a specified interval. Notwithstanding, a current channel, media pair and/or cross connect status may be provided by the channel assignment/wiring order diagnostics.

Figure 4:
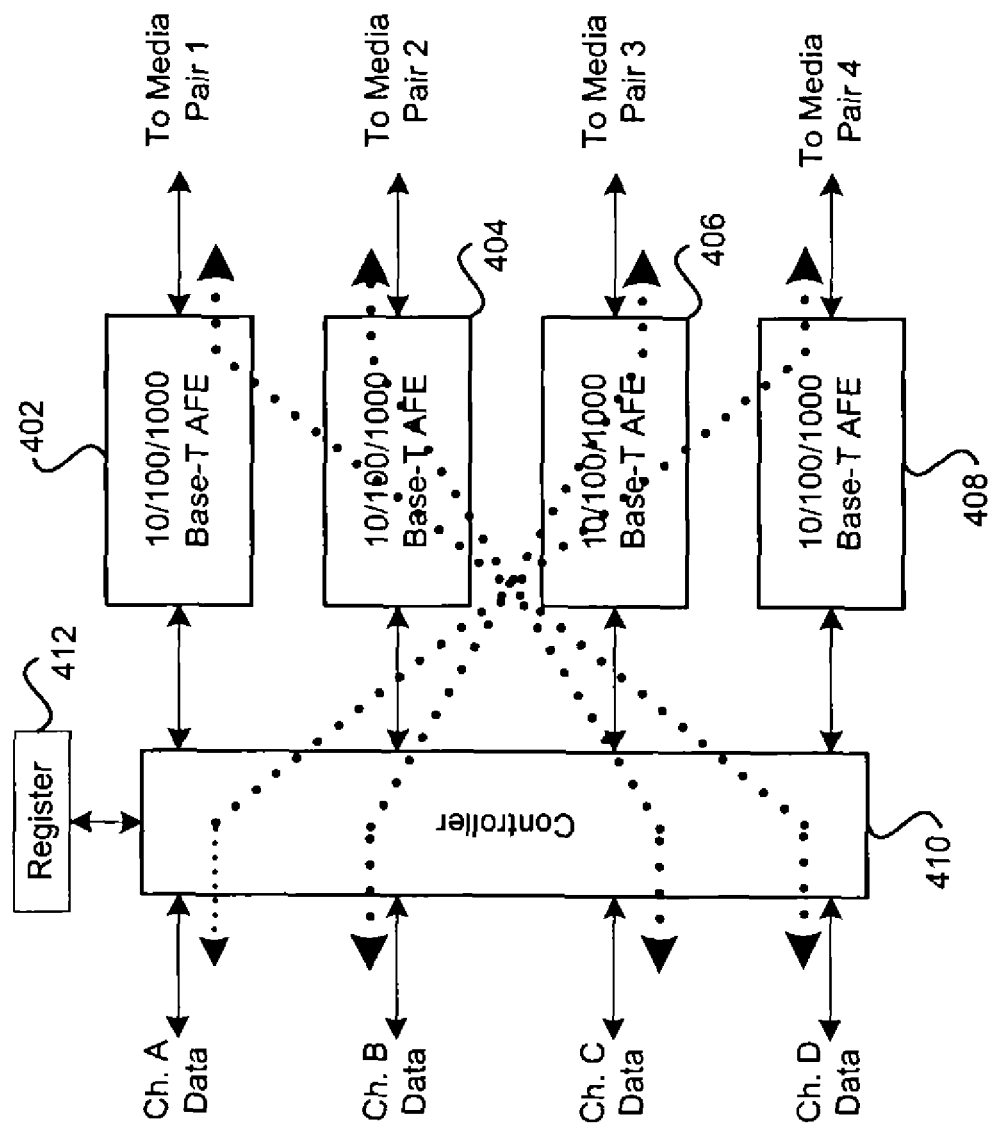
FIG. 4 is a block diagram of an automatic media dependent interface reconfigure and repair system, which may provide flip port assignment in accordance with an embodiment of the invention.

FIG. 4 is a block diagram of an automatic media dependent interface reconfigure and repair system, which may provide flip port assignment in accordance with an embodiment of the invention. Referring to FIG. 4, there is shown a first 10/100/1000 Base-T AFE 402, a second 10/100/1000 Base-T AFE 404, a third 10/100/1000 Base-T AFE 406, a fourth 10/100/1000 Base-T AFE 408, a single controller 410 and a register 412.

In general, channel A may be assigned to media pair 1, channel 2 may be assigned to media pair 2, channel 3 may be assigned to media pair 3 and channel 4 may be assigned to media port 4. In accordance with an embodiment of the invention, controller 410 or an external processor may be adapted to configure register 412 to establish a default assignment for each of the channels and/or the media pairs. In this regard, the general assignment of the channels to media pairs may be flipped to create a default channel/media pair assignment. Accordingly after flipping the channels/media pairs, channel A may be assigned to media pair 4, channel 2 may be assigned to media pair 3, channel 3 may be assigned to media pair 2 and channel 4 may be assigned to media pair 1. In this case, the channel/media pairs may be flipped with respect to the general channel/media pair assignment. Notwithstanding, the invention is not limited in this regard and other default channel/media pair assignments other than the general channel/media pair assignment may be similarly defined.

In accordance with an embodiment of the invention, the flip port assignment provided by the automatic MDI reconfigure and repair system may allow a single die or package to be used in legacy trace ordering of media pairs. In this regard, a single die or chip may be created for use by a plurality of customers, some of which may desire their own trace ordering on their printed circuit board (PCB). For example, the flip port assignment provided by the automatic MDI reconfigure and repair system may permit a single die or package to be utilized by a first customer requiring inline ordering and a second customer requiring mirror ordering. Moreover, flip port assignment may provide greater flexibility in the utilization of magnetics and connectors such as RJ45, without having to re-engineer and/or make significant board changes. For example, a customer may chose to place channel A on the right side of PCB and channel D on the left side of a PCB layout and/or package. Finally, the flip port assignment provided by the automatic MDI reconfigure and repair system in accordance with an embodiment of the invention may permit tapeout of a single die that can be used in die-up or die-down applications. This may be particularly important in, for example, flip-chip designs where package substrate cannot be customized to accommodate customer needs.

Figure 5:
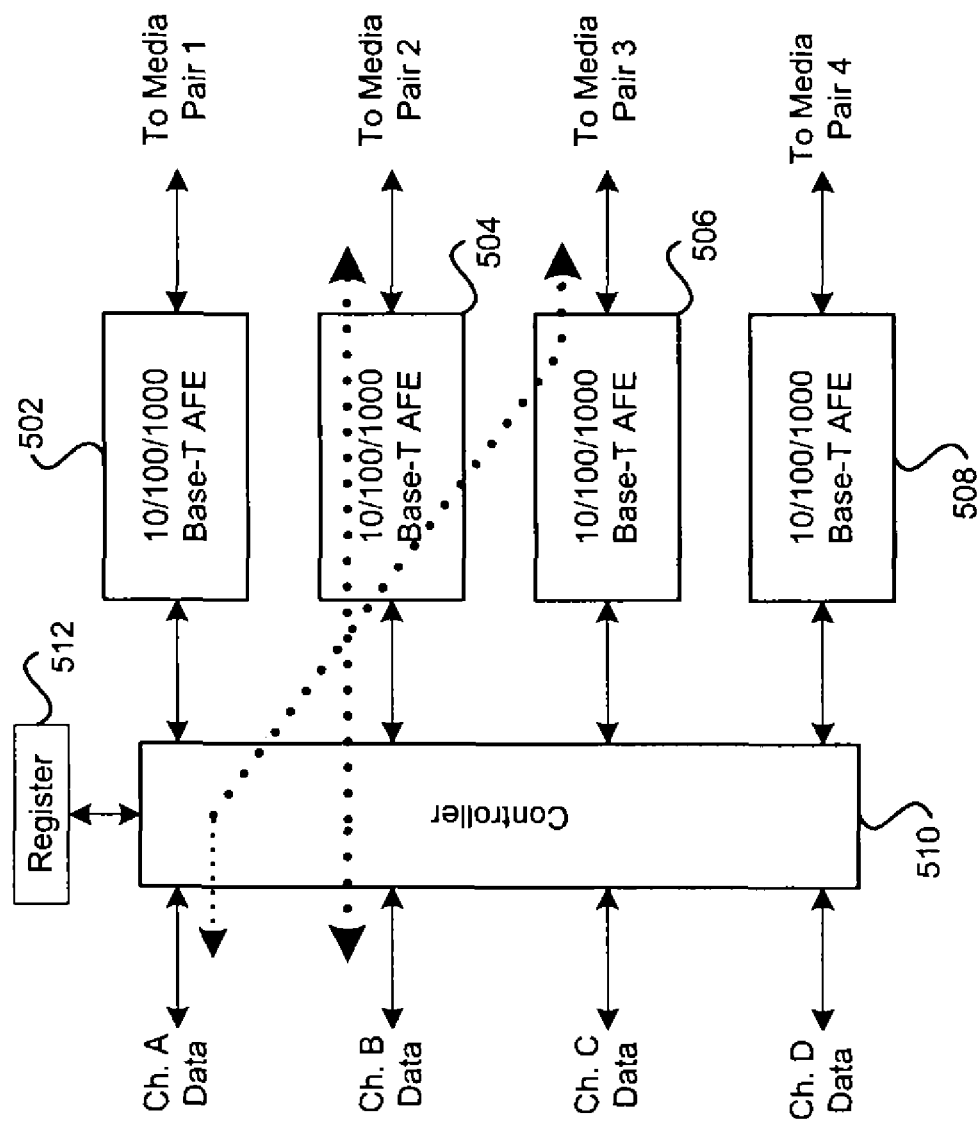
FIG. 5 is a block diagram of an automatic media dependent interface reconfigure and repair system, which may provide 10/100 Base-T over any pair in accordance with an embodiment of the invention.

FIG. 5 is a block diagram of an automatic media dependent interface reconfigure and repair system, which may provide 10/100 Base-T over any pair in accordance with an embodiment of the invention. Referring to FIG. 5, there is shown a first 10/100/1000 Base-T AFE 502, a second 10/100/1000 Base-T AFE 504, a third 10/100/1000 Base-T AFE 506, a fourth 10/100/1000 Base-T AFE 508, a single controller 510 and a register 512.

In operation, controller 510 may be adapted to arbitrarily assign any of channels A, B, C and D to any of media pairs 1, 2, 3 and 4. The automatic media dependent interface reconfigure and repair system may monitor link activity or pulses from, for example, an auto-MDIX pair and determine the primary channel A and channel B assignments. Based on the determined primary channel assignment, the controller 510 may cross-connect the channel to the appropriate media pair. Controller 510 may be configured to set or clear one or more bits in register 512. The bits in the register 512 may be utilized to indicate a current cross-connect status of the automatic MDI reconfigure and repair system. In this regard a host processor or controller 510, for example, may be adapted to read appropriate portions of register 512 in order to determine an automatic MDI reconfigure and repair cross-connect status. Additionally, one or more bits in the control register may be used to specify or establish a particular cross-connect configuration between any of the channels and any of the media pairs. Accordingly, an external processor and/or controller 510 may be adapted to set or clear certain bits in the register 512 in order to indicate a desired channel/media pair cross-connection. The controller 512 may subsequently read the register 512 and configure the desired cross-connect arrangement. In another aspect of the invention, the automatic MDI reconfigure and repair status system may indicate which of the media pairs are available and currently active or in use. The automatic MDI reconfigure and repair status may also provide an indication of the current cross-connection of the channel/media pairs.

In accordance with another embodiment of the invention, the automatic MDI reconfigure and repair system which provides 10/100 Base-T over any pair, may be configured to provide communication over usable media pairs when one or more media pair may be damaged. This may be particularly useful in cases where each communicating PHY may have automatic MDI reconfigure and repair capability. Another particularly useful application may include those cases involving improper cabling between two communicating PHY devices, such as a local PHY and a remote PHY. In this regard, the automatic MDI reconfigure and repair system may be adapted to determine the broken pair and reconfigure or cross-connect the channels to operate 10/100BT over available or usable media pairs.

Controller 510 may also be adapted to monitor link activity and determine which media pair may be broken and which media pairs may be available and/or usable. The controller 510 may be adapted to mark a broken media pair as being out of service to prevent any attempted cross-connections using the broken media pair. The broken media pair may be denoted as being out of service by setting or clearing one or more appropriate bits in register 512. Notwithstanding, the determined available or usable media pair and the channel may be cross-connected by controller 510. Controller 510 may set and/or clear appropriate bits in register 512 to reflect the reassignment of the channel and the media pair. The reassigned channel and/or media pair may be marked as being in use by setting and/or clearing one or more bits in register 512. Referring to FIG. 5, channel A has been reassigned to media pair 3 since a determination has been made that media pair 3 is available and usable.

In another embodiment of the invention, the automatic MDI reconfigure and repair system may be adapted to provide lifeline service. In certain instances, reduced or limited services may be provided to ensure continued communication service. For example, reduced lifeline communication service is provided to make emergency call only or to provide basic calling features only. Lifeline service may be provided in instances where a 1000 Base-T fails due to a cable plant failure or improper cable installation. In this regard, an automatic MDI reconfigure and repair capable PHY may locate a new available and/or usable media pair to continue 10/100 Base-T communication via the new media pair. Lifeline services may be utilized in instances where a non-capable automatic MDI reconfigure and repair PHY may still be capable of communicating via media pairs 1 and 2. Lifeline services may also be utilized in instances where two (2) communicating PHYs have automatic MDI reconfigure and repair capability. In instances where lifeline service may be provided, automatic MDI reconfigure and repair may be configured to negotiate reduced communication speeds to facilitate some level of communication.

Figure 6:
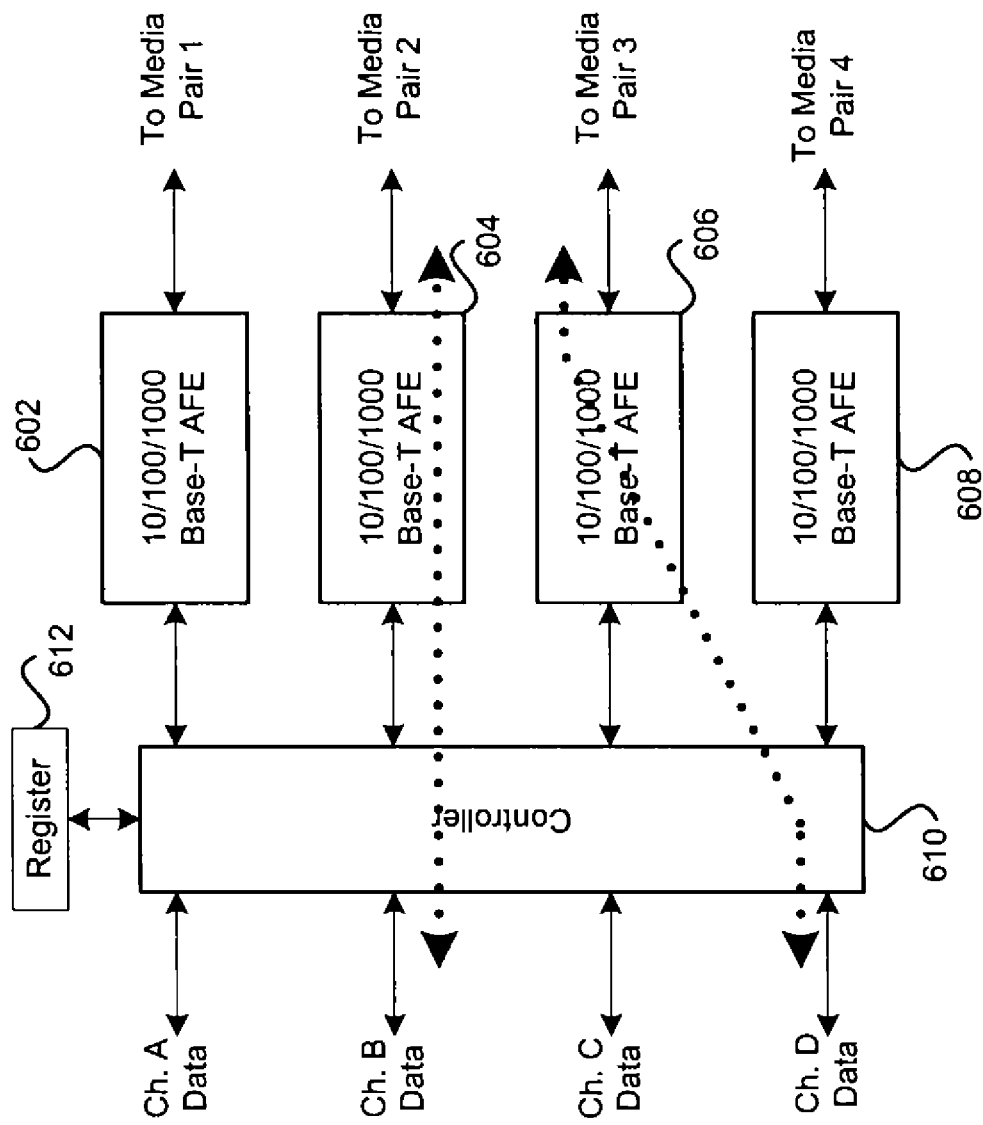
FIG. 6 is a block diagram of an automatic media dependent interface reconfigure and repair system, which may provide lifeline service in accordance with an embodiment of the invention.

FIG. 6 is a block diagram of an automatic media dependent interface reconfigure and repair system, which may provide lifeline service in accordance with an embodiment of the invention. Referring to FIG. 6, there is shown a first 10/100/1000 Base-T AFE 602, a second 10/100/1000 Base-T AFE 604, a third 10/100/1000 Base-T AFE 606, a fourth 10/100/1000 Base-T AFE 608, a single controller 610 and a register 612.

In operation, controller 610 may be adapted to monitor link activity and determine which media pair may be broken and which media pairs may be available and/or usable. The controller 610 may mark the broken media pair as being out of service to prevent any attempted cross-connections using the broken media pair. The broken media pair may be denoted as being out of service by setting or clearing one or more appropriate bits in register 612. Notwithstanding, the determined available or usable media pair and channel may be cross-connected by controller 610. Controller 610 may set and/or clear appropriate bits in register 612 to reflect the reassignment of the channel and the media pair. In a case where media pair 1 is broken but media pairs 2, 3, 4 are usable and/or available, controller 610 may cross-connect channel B with media pair 2 and channel D with media pair 4. In this case channel D has been reassigned to media pair 3 where lifeline service may be provided at reduced communication speeds.

Another embodiment provides an automatic MDI reconfigure and repair system that provides a 100/100 Base-T link. In instances where a 10/100 Base-T link may fail on standard media pairs 1 and 2, an automatic MDI reconfigure and repair capable PHY, namely a first PHY, may be adapted to switch communication to media pairs 3 and 4. Accordingly, the PHY with which the first PHY is communicating, namely a second PHY, may be adapted to switch to media pairs 3 and 4 in order to continue 10/100 Base-T operation. In this regard, media pairs 3 and 4 may operate as a redundant 10/100 Base-T link. Although service may be impaired, some minimal services may be provided until normal service may be restored via standard media pairs 1 and 2.

Figure 7:
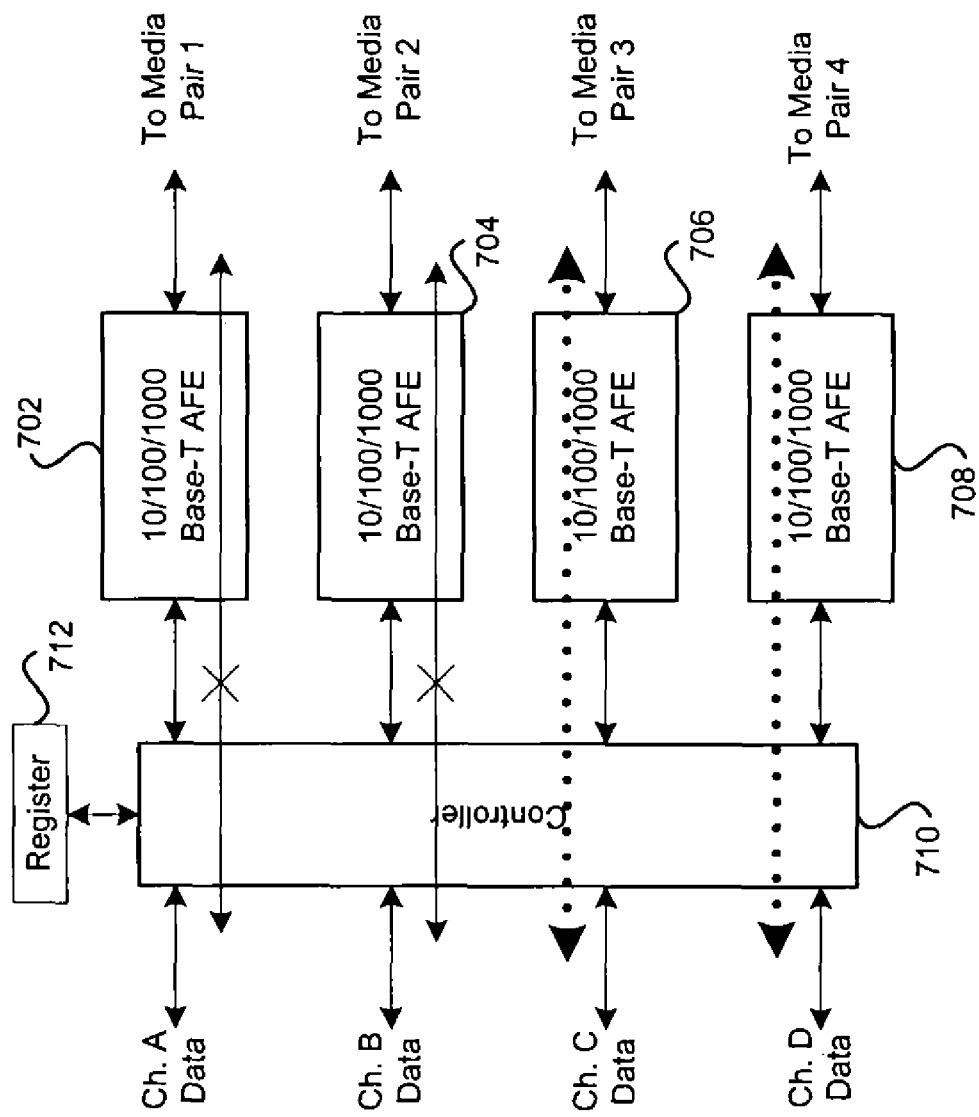
FIG. 7 is a block diagram of an automatic media dependent interface reconfigure and repair system, which may provide lifeline service in accordance with an embodiment of the invention.

FIG. 7 is a block diagram of an automatic media dependent interface reconfigure and repair system, which may provide lifeline service in accordance with an embodiment of the invention. Referring to FIG. 7, there is shown a first 10/100/1000 Base-T AFE 702, a second 10/100/1000 Base-T AFE 704, a third 10/100/1000 Base-T AFE 706, a fourth 10/100/1000 Base-T AFE 708, a single controller 710 and a register 712.

In operation, controller 710 may be adapted to monitor link activity and determine which media pair may be broken and which media pairs may be available and/or usable. The controller 710 may mark the broken media pair as being out of service to prevent any attempted cross-connections using the broken media pair. The broken media pair may be denoted as being out of service by setting or clearing one or more appropriate bits in register 712. Notwithstanding, the determined available and/or usable media pair and the channel may be cross-connected by controller 710. Controller 710 may set and/or clear appropriate bits in register 712 to reflect the reassignment of the channel and the media pair. In a case where media pairs 1 and 2 are broken or otherwise impaired but media pairs 3, 4 are usable and/or available, controller 710 may cross-connect channel C with media pair 3 and channel D with media pair 4. In this case, channel C has been reassigned to media pair 3 and channel D has been reassigned to media pair 4 and media pairs 3 and 4 may function as redundant 10/100 Base-T link.

Figure 8:
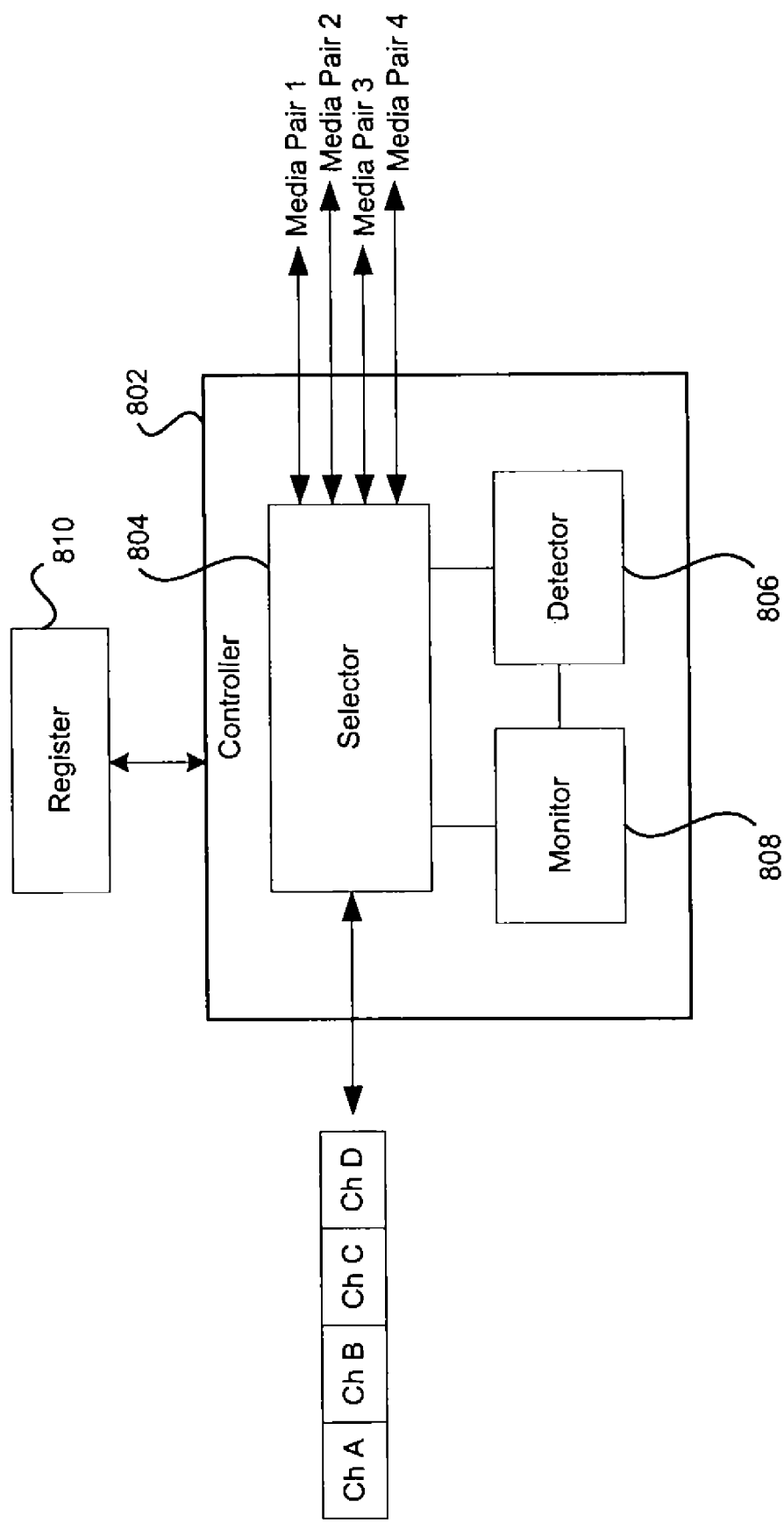
FIG. 8 is an exemplary system for providing and configuring communication links in accordance with an embodiment of the invention.

FIG. 8 is an exemplary system for providing and configuring communication links in accordance with an embodiment of the invention. Referring to FIG. 8, there is shown a controller block 802 and a register block 810. The controller block 802 may include a selector block 804, a detector block 808 and a monitor block 806. The selector block 804 may be a multiplexer that may be coupled to one or more media which may bear channels A, B, C and D. The selector block 804 may also be coupled to one or more media which may bear media pairs, namely media pairs 1, 2, 3 and 4. In this regard, there are four media pairs shown. Notwithstanding, the invention is not so limited and other correspondingly more channels and/or media pairs may be handled by controller block 802 of the system. Although the selector block 804, monitor block 808 and detector block 806 are shown within controller block 802, the invention is not so limited and other arrangements may be possible. For example, any one or more of the selector block 804, monitor block 808 and detector block 806 may be located externally to the controller block 802.

The controller block 802 may be adapted to determine a usable media pair from all of the existing media pairs. The selector block 804 may facilitate the selection of any channel from all of the existing channels and the controller block 802 may assign the selected channel to any one of the selected media pairs. The controller block 802 may also be configured to determine at least one usable media pair from all of the existing media pairs. The detector block 806 may detect whether a communication signal is present on any one of the usable media pairs, namely media pairs 1, 2, 3, and 4. In this regard the detector block 806 may contain suitable logic and/or circuitry to detect pulses on any of the media pairs.

In another aspect of the invention, the controller block 802 may determine which one of the existing media pairs may be capable of facilitating communication at a maximum or specified communication speed. The selector block 804 may subsequently cross-connect the selected channel to the existing media pair which is capable of facilitating communication at the maximum communication speed. Similarly, the controller block 802 may also determine which one of the existing media pairs may be capable of operating at a reduced communication speed relative to the maximum communication speed. The selector block 804 may subsequently cross-connect the selected channel to the existing media pair which is capable of operating at the reduced communication speed. The selector block 804 may also be configured to flip any channel/media pair assignment of a previously defined general channel/media pair configuration, which defines channel/media pair assignments for at least a portion of the existing media pairs. The controller block 802 may then define the flipped channel/media pair assignment as a default channel/media pair configuration.

The controller block 802 may be adapted to identify a status of at least one of the existing media pairs, at least one of the existing channels and at least one channel/media pair cross-connection. One or more registers in the register block 810 may store the identified status in one or more bit locations. Appropriate bit locations in at least one register in the register block 810 may be written to reflect changes to a media pair, a channel and/or a cross-connection. Similarly, appropriate bit locations in a register block 810 may be read to determine the status of a media pair, a channel and/or a cross-connection.

In one embodiment of the invention, automatic media dependent interface reconfiguration and repair may be used to enhance the capabilities offered by auto-MDIX. In this regard, automatic media dependent interface reconfiguration and repair may extend the capabilities of auto-MDIX by allowing auto-MDIX to provide support for media pairs other than media pairs 1 and 2, and media pairs 2 and 4. Accordingly, auto-MDIX using automatic MDI reconfiguration and repair may permit reconfiguration of media pairs 1 and 3 and media pairs 2 and 4 for use by any of a plurality of channels.

Since multiple transceivers may be implemented on a single PHY device, automatic MDI reconfiguration and repair may be flexibly integrated within a PHY device without requiring any additional premium chip real estate. For this reason, automatic MDI reconfiguration and repair may be adapted to utilize existing gigabit architectures without a need for extensive re-engineering which may be costly and time consuming. Additionally, existing PHY transceiver analog front ends (AFEs) utilized in Gigabit products have the capability to transmit and receive at, for example, 10 Base-T and 100 Base-TX on all pairs. Moreover, external components for gigabit products such as termination resistors and magnetics may be readily capable of transmitting and receiving 10 Base-T and 100 Base-TX on all media pairs. This makes automatic MDI reconfiguration and repair more desirable that any conventional system. Accordingly, supplemental hardware may be added or existing hardware may be augmented to arbitrarily switch channel assignments to any pair using automatic MDI interface reconfiguration and repair in accordance with the invention. Automatic MDI reconfiguration and repair may also permit detection of available media pairs and provide dynamic assignment of channels to the available pairs. In this regard, automatic MDI reconfiguration and repair may provide a flexible approach for facilitating full multiplexing of channel data to available media pairs.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing and configuring Ethernet communication links of a device, the method comprising:
   determining any one usable media pair from at least three media pairs of all existing media pairs, wherein each of said media pairs comprises a twisted pair;
   selecting any one channel from all existing channels corresponding to all existing media pairs; and
   assigning said selected any one channel to said any one usable media pair, wherein the device communicates using said at least three media pairs of said all existing media pairs.

2. The method according to claim 1, wherein said determining comprises monitoring at least said any one usable media pair.

3. The method according to claim 2, wherein said monitoring comprises detecting an existence of a communication signal on said any one usable media pair.

4. The method according to claim 1, comprising determining which one of said all existing media pairs facilitates communication at a maximum communication speed.

5. The method according to claim 1, comprising determining which one of said all existing media pairs facilitates operating at a reduced communication speed.

6. The method according to claim 1, comprising identifying a status of at least one of said all existing media pairs and at least one of said all existing channels.

7. The method according to claim 6, comprising storing said identified status.

8. A non-transitory machine-readable storage having stored thereon, a program having at least one code section for providing and configuring Ethernet communication links of a device, the at least one code section being executable by a machine for causing the machine to perform steps comprising:
 determining any one usable media pair from at least three media pairs of all existing media pairs, wherein said each of media pairs comprises a twisted pair;
 selecting any one channel from all existing channels corresponding to all existing media pairs; and
 assigning said selected any one channel to said any one usable media pair, wherein the device communicates using said at least three media pairs of said all existing media pairs.

9. The machine-readable storage according to claim 8, wherein said at least one code section comprises code for monitoring at least said any one usable media pair.

10. The machine-readable storage according to claim 9, wherein said at least one code section comprises code for detecting an existence of a communication signal on said any one usable media pair.

11. The machine-readable storage according to claim 8, wherein said at least one code section comprises code for determining which one of said all existing media pairs facilitates communication at a maximum communication speed.

12. The machine-readable storage according to claim 8, wherein said at least one code section comprises code for determining which one of said all existing media pairs operates communication at a reduced communication speed.

13. The machine-readable storage according to claim 8, wherein said at least one code section comprises code for identifying a status of at least one of said all existing media pairs and at least one of said all existing channels.

14. The machine-readable storage according to claim 13, wherein said at least one code section comprises code for storing said identified status.

15. A system for providing and configuring Ethernet communication links, the system comprising:
 at least one controller enabled to determine any one usable media pair from at least three media pairs of all existing media pairs, wherein said each of media pairs comprises a twisted pair;
 at least one selector enabled to select any one channel from all existing channels corresponding to all existing media pairs; and
 said at least one controller enabled to assign said selected any one channel to said any one usable media pair, wherein said at least one controller communicates using said at least three media pairs of said all existing media pairs.

16. The system according to claim 15, wherein said at least one controller is enabled to determine at least said any one usable media pair.

17. The system according to claim 16, wherein said at least one controller comprises a detector enabled to detect an existence of a communication signal on said any one usable media pair.

18. The system according to claim 15, wherein said at least one controller is enabled to determine which one of said all existing media pairs facilitates communication at a maximum communication speed.

19. The system according to claim 15, wherein said at least one controller is enabled to determine which one of said all existing media pairs operates communication at a reduced communication speed.

20. The system according to claim 15, wherein said at least one controller is enabled to identify a status of at least one of said all existing media pairs and at least one of said all existing channels.

21. The system according to claim 20, comprising at least one register enabled to store said identified status.

22. A method for providing and configuring Ethernet communication links of a device, the method comprising:
 determining any one usable media pair from at least three media pairs of all existing media pairs, wherein each of said media pairs comprises a twisted pair;
 selecting any one channel from all existing channels corresponding to all existing media pairs;
 assigning said selected any one channel to said any one usable media pair;
 determining which one of said all existing media pairs facilitates communication at a maximum communication speed; and
 cross-connecting said selected any one channel to said one of said all existing media pairs that facilitates communication at a maximum communication speed, wherein the device communicates using said at least three media pairs of said all existing media pairs.

23. A method for providing and configuring Ethernet communication links of a device, the method comprising:
 determining any one usable media pair from at least three media pairs of all existing media pairs, wherein each of said media pairs comprises a twisted pair;
 selecting any one channel from all existing channels corresponding to all existing media pairs;
 assigning said selected any one channel to said any one usable media pair;
 determining which one of said all existing media pairs facilitates operating at a reduced communication speed; and
 cross-connecting said selected any one channel to said one of said all existing media pairs that facilitates operating at said reduced communication speed, wherein the device communicates using said at least three media pairs of said all existing media pairs.

24. A method for providing and configuring Ethernet communication links of a device, the method comprising:
 determining any one usable media pair from all existing media pairs, wherein each of said media pairs comprises a twisted pair;
 selecting any one channel from all existing channels corresponding to all existing media pairs;
 assigning said selected any one channel to said any one usable media pair;
 flipping one or both of a channel and a media pair assignment of a previously defined general channel and media pair configuration which defines channel and media pair assignments for at least a portion of said all existing media pairs; and
 defining said flipped one or both of a channel and a media pair assignment as a default channel and media pair configuration, wherein the device communicates using at least three media pairs of said all existing media pairs.

25. A non-transitory machine-readable storage having stored thereon, a program having at least one code section for providing and configuring Ethernet communication links of a device, the at least one code section being executable by a machine for causing the machine to perform steps comprising:
- determining any one usable media pair from at least three media pairs of all existing media pairs, wherein each of said media pairs comprises a twisted pair;
- selecting any one channel from all existing channels corresponding to all existing media pairs;
- assigning said selected any one channel to said any one usable media pair;
- determining which one of said all existing media pairs facilitates communication at a maximum communication speed; and
- cross-connecting said selected any one channel to said one of said all existing media pairs that facilitates communication at a maximum communication speed, wherein the device communicates using said at least three media pairs of said all existing media pairs.

26. A non-transitory machine-readable storage having stored thereon, a program having at least one code section for providing and configuring Ethernet communication links of a device, the at least one code section being executable by a machine for causing the machine to perform steps comprising:
- determining any one usable media pair from at least three media pairs of all existing media pairs, wherein each of said media pairs comprises a twisted pair;
- selecting any one channel from all existing channels corresponding to all existing media pairs;
- assigning said selected any one channel to said any one usable media pair;
- determining which one of said all existing media pairs operates communication at a reduced communication speed; and
- cross-connecting said selected any one channel to said one of said all existing media pairs that operates communication at said reduced communication speed, wherein the device communicates using said at least three media pairs of said all existing media pairs.

27. A non-transitory machine-readable storage having stored thereon, a program having at least one code section for providing and configuring Ethernet communication links of a device, the at least one code section being executable by a machine for causing the machine to perform steps comprising:
- determining any one usable media pair from all existing media pairs, wherein each of said media pairs comprises a twisted pair;
- selecting any one channel from all existing channels corresponding to all existing media pairs;
- assigning said selected any one channel to said any one usable media pair;
- flipping one or both of a channel and a media pair assignment of a previously defined general channel and media pair configuration which defines channel and media pair assignments for at least a portion of said all existing media pairs; and
- defining said flipped one or both of said channel and said media pair assignment as a default channel and media pair configuration, wherein the device communicates using at least three media pairs of said all existing media pairs.

28. A system for providing and configuring Ethernet communication links, the system comprising:
- at least one controller enabled to determine any one usable media pair from at least three media pairs of all existing media pairs, wherein each of said media pairs comprises a twisted pair;
- at least one selector enabled to select any one channel from all existing channels corresponding to all existing media pairs; and
- said at least one controller enabled to assign said selected any one channel to said any one usable media pair,
- wherein said at least one controller communicates using said at least three media pairs of said all existing media pairs,
- wherein said at least one controller is enabled to determine which one of said all existing media pairs facilitates communication at a maximum communication speed, and
- wherein said selector is enabled to cross-connect said selected any one channel to said one of said all existing media pairs that facilitates communication at a maximum communication speed.

29. A system for providing and configuring Ethernet communication links, the system comprising:
- at least one controller enabled to determine any one usable media pair from at least three media pairs of all existing media pairs, wherein each of said media pairs comprises a twisted pair;
- at least one selector enabled to select any one channel from all existing channels corresponding to all existing media pairs; and
- said at least one controller enabled to assign said selected any one channel to said any one usable media pair,
- wherein said at least one controller communicates using said at least three media pairs of said all existing media pairs,
- wherein said at least one controller is enabled to determine which one of said all existing media pairs operates communication at a reduced communication speed, and
- wherein said selector is enabled to cross-connect said selected any one channel to said one of said all existing media pairs that operates communication at said reduced communication speed.

30. A system for providing and configuring Ethernet communication links, the system comprising:
- at least one controller enabled to determine any one usable media pair from all existing media pairs, wherein each of said media pairs comprises a twisted pair;
- at least one selector enabled to select any one channel from all existing channels corresponding to all existing media pairs; and
- said at least one controller enabled to assign said selected any one channel to said any one usable media pair,
- wherein said at least one controller communicates using at least three media pairs of said all existing media pairs,
- wherein said selector is enabled to flip one or both of a channel and a media pair assignment of a previously defined general channel and media pair configuration which defines channel and media pair assignments for at least a portion of said all existing media pairs, and
- said controller is enabled to define said flipped one or both of said channel and said media pair assignment as a default channel and media pair configuration.

* * * * *